United States Patent [19]

Ogawa

[11] Patent Number: 5,911,058
[45] Date of Patent: Jun. 8, 1999

[54] INSTRUCTION QUEUE CAPABLE OF CHANGING THE ORDER OF READING INSTRUCTIONS

[75] Inventor: Yoshikazu Ogawa, Kanagawa-ken, Japan

[73] Assignee: Kabushiki Kaisha Toshiba, Kawasaki, Japan

[21] Appl. No.: 08/861,534

[22] Filed: May 22, 1997

[30] Foreign Application Priority Data

May 23, 1996 [JP] Japan ..................................... 8-128560

[51] Int. Cl.⁶ ....................................................... G06F 9/38
[52] U.S. Cl. ........................................... 395/395; 395/392
[58] Field of Search ..................................... 395/384, 390, 395/391, 392, 393, 394, 395, 580, 581, 800.23, 800.41

[56] References Cited

U.S. PATENT DOCUMENTS

| | | |
|---|---|---|
| 5,251,306 | 10/1993 | Tran ......................................... 395/393 |
| 5,381,531 | 1/1995 | Hanawa et al. ........................... 395/582 |
| 5,488,729 | 1/1996 | Vegesna et al. .......................... 395/385 |
| 5,511,172 | 4/1996 | Kimura et al. ........................... 395/582 |
| 5,684,971 | 11/1997 | Martell et al. ............................ 395/393 |
| 5,699,537 | 12/1997 | Sharanppani et al. ................... 395/393 |

*Primary Examiner*—Parshotam S. Lall
*Assistant Examiner*—Viet Vu
*Attorney, Agent, or Firm*—Foley & Lardner

[57] ABSTRACT

An instruction queue 80 maintains the CPI (clock cycles per instruction) and performance of a microprocessor that employs the instruction queue even if a branch instruction is executed. The queue 80 stores valid instructions in an instruction memory 810. When a branch instruction is supplied to the queue 80, the queue 80 detects instructions that are independent of the branch instruction in the memory 810, and an order controller 1300 puts the independent instructions behind the branch instruction in the memory 810. The queue 80 quickly finds a branch instruction, to let a cache start refilling speedily. While the cache is being refilled, the independent instructions put behind the branch instruction are executed to improve the CPI.

4 Claims, 7 Drawing Sheets

INSTRUCTION QUEUE CAPABLE OF CHANGING THE ORDER OF READING INSTRUCTIONS

BACKGROUND OF THE INVENTION

1. Field of the Invention

The present invention relates to an instruction queue of a microprocessor, used to hold prefetched instructions.

2. Description of the Prior Art

FIG. 1 shows a microprocessor having an instruction queue according to a prior art.

Components of the microprocessor will be explained. A main memory 100 stores instructions and data. An instruction cache 200 temporarily stores some of the instructions stored in the main memory 100 and is accessible at a high speed. An instruction fetch unit 300 fetches an instruction from the main memory 100 or from the cache 200. An instruction decoder 400 decodes an instruction transferred from the fetch unit 300 into an executable instruction. An execution unit 500 executes the executable instruction sent from the decoder 400. A register file 600 stores data required for executing an instruction. A data cache 700 stores part of data stored in the main memory 100 and is accessible at a high speed.

Components of the execution unit 500 will be explained. A branch unit 510 executes a branch instruction. An ALU 520 executes an arithmetic instruction or a logic instruction. A shifter 530 executes a shift instruction. A load unit 540 executes a load instruction. A store unit 550 executes a store instruction. The execution unit 500 loads and stores data with respect to the register file 600 and the data cache 700.

An instruction queue 800 is arranged between the decoder 400 and the execution unit 500. The queue 800 serves as a buffer. Variable-length instructions involve different fetch times, and therefore, the decoder 400 sometimes unable to continuously supply executable instructions to the execution unit 500. Accordingly, the queue 800 functions to temporarily store and continuously supply executable instructions to the execution unit 500, to improve the performance of the microprocessor.

FIG. 2 shows an example of the queue 800 according to the prior art.

The instruction queue of FIG. 2 is designed to hold six instructions. This number is only an example and is optional in practice.

Components of the queue 800 will be explained. An instruction memory 810 stores instructions supplied by the decoder 400. A write decoder 820 specifies a write address in the instruction memory 810. A read decoder 840 specifies a read address in the instruction memory 810. A write controller 860 controls a write operation. A read controller 865 controls a read operation. A counter 870 provides the write decoder 820 with write address data. A counter 875 provides the read decoder 840 with read address data. An input buffer 880 holds an instruction from the decoder 400 and sends it to the instruction memory 810 in response to a write enable signal from the write controller 860. An output buffer 885 holds an instruction from the instruction memory 810 and sends it to the execution unit 500 in response to a read enable signal from the read controller 865. A validity memory 890 indicates the validity of each instruction stored in the instruction memory 810. A full-valid-state detector 1000 determines whether or not the instruction memory 810 is full of valid instructions. A full-invalid-state detector 1005 determines whether or not the instruction memory 810 has no valid instruction.

The counters 870 and 875 are initialized to the same value in response to a reset signal. At this time, the validity memory 890 is completely zeroed to indicate that the instruction memory 810 is empty.

A write operation in the initial state will be explained. The decoder 400 provides the queue 800 with a write request and an instruction to write. The write decoder 820 receives write address data from the counter 870 through a line 871 and specifies a write address in the instruction memory 810 through lines 821 to 826. The write controller 860 supplies a write enable signal to the input buffer 880 through a line 862. Then, the instruction is written into the instruction memory 810 at the specified address. At the same time, the write decoder 820 sends "1" to indicate the validness of the written instruction to a corresponding one of flip-flops 891 to 896 of the validity memory 890 through lines 831 to 836. The write controller 860 increments the counter 870 by one through a line 861.

Any instruction from the decoder 400 is written into the instruction memory 810 as long as the memory 810 has a vacancy. When the instruction memory 810 becomes full of valid instructions, the full-valid-state detector 1000 detects it and sends a write prohibition request to the write controller 860. Then, the write controller 860 provides the input buffer 880 with no write enable signal even if the decoder 400 provides an instruction and a write request.

If an instruction is read out of the instruction memory 810, the full-valid-state detector 1000 withdraws the write prohibition request. Then, the write controller 860 provides the input buffer 880 with a write enable signal whenever the decoder 400 sends an instruction request and an instruction to write.

A read operation will be explained. The execution unit 500 issues a read request. The read decoder 840 receives read address data from the counter 875 through a line 876 and specifies a read address in the instruction memory 810 through lines 841 to 846. The read controller 865 provides the output buffer 885 with a read enable signal through a line 867 so that an instruction is read out of the specified address of the instruction memory 810. At the same time, the read decoder 840 sends "0" to indicate the invalidness of the read address to a corresponding one of the flip-flops 891 to 896 of the validity memory 890 through lines 851 to 856 and OR gates 901 to 906. The read controller 865 increments the counter 875 by one through a line 866.

Any read request is met as long as the instruction memory 810 has valid instructions. When the instruction memory 810 becomes empty, the full-invalid-state detector 1005 detects it and provides the read controller 865 with a read prohibition request.

Upon receiving the read prohibition request, the read controller 865 provides the output buffer 885 with no read enable signal even if the execution unit 500 issues a read request. If a new instruction is written into the instruction memory 810 so that the memory 810 has at least one valid instruction, the full-invalid-state detector 1005 withdraws the read prohibition request. Consequently, the read controller 865 provides the output buffer 885 with the read enable signal whenever the execution unit 500 issues a read request.

If an exception or a branch instruction is effected, valid instructions stored in the instruction memory 810 will be unnecessary. In this case, a reset signal zeroes the validity memory 890.

As explained above, write and read operations with respect to the instruction memory 810 are carried out independently of each other. The read counter 875 follows the write counter 870, and therefore, instructions are read out of the instruction memory 810 in written order. If the instruction memory 810 is full of valid instructions, any write request is rejected, and if the memory 810 is empty, any read request is rejected.

To explain the problems of the prior art, the operating conditions of the microprocessor and queue 800 will be explained first.

The fetch unit 300 fetches hit instructions from the cache 200 at a rate of two instructions in two cycles. The fetch unit 300 fetches cache-missed instructions from the main memory 100 at a rate of two instructions in four cycles. The branch unit 510, load unit 540, and store unit 550 of the execution unit 500 need each two cycles to execute an instruction, and the ALU 520 and shifter 530 thereof need each a cycle to execute an instruction. Only after completely executing a given instruction, the execution unit 500 provides the queue 800 with a read request.

Write and read requests to the queue 800 are never simultaneously made. For example, a write request is made in the first half of a cycle and a read request in the second half thereof. When write and read requests continuously occur, they occur only alternately and never simultaneously.

If the fetch unit 300 fetches hit instructions from the cache 200 continuously, it will be able to provide the decoder 400 with an instruction every cycle. Then, the decoder 400 may provide the queue 800 with a write request every cycle. If instructions to be executed by the ALU 520 or shifter 530 are continuously supplied to the execution unit 500, the execution unit 500 will provide the queue 800 with a read request every cycle because the instructions are executed cycle by cycle.

If load and store instructions each needing two cycles to execute are continuously supplied to the execution unit 500, the execution unit 500 will intermittently provide the queue 800 with read requests. During this period, instructions transferred from the decoder 400 are stored in the queue 800.

If the cache 200 does not have an instruction requested by the fetch unit 300, the cache 200 must be refilled. Until the cache 200 is refilled with instructions, the fetch unit 300 is unable to supply instructions to the decoder 400. This causes an idling period of two in four cycles.

If a branch instruction comes, the fetch unit 300 must change an instruction fetching address accordingly. Then, the fetch unit 300 will miss the cache 200 and must access the main memory 100. During this operation, a read request from the execution unit 500 is rejected.

During a period between receiving a branch instruction by the queue 800 and executing the same by the execution unit 500, the queue 800 accumulates instructions sent from the decoder 400. There is a great probability of these instructions being not executed once the branch instruction is executed.

The fetching of these useless instructions deteriorates the CPI (clock cycles per instruction) and performance of the microprocessor.

As explained above, the prior art frequently misses the cache 200 when executing a branch instruction and must access the main memory 100 until the cache 200 is refilled with required instructions. This results in idling the execution unit 500 without instructions to execute.

Further, the prior art accumulates useless instructions in the queue 800 while passing the branch instruction from the decoder 400 to the execution unit 500 through the queue 800.

Due to these problems, the performance of the microprocessor of the prior art drops whenever a branch instruction occurs.

SUMMARY OF THE INVENTION

An object of the present invention is to provide an instruction queue that quickly determines, whenever a branch instruction is fetched, instructions that have been fetched before the branch instruction and are independent of the branch instruction. The instruction queue puts the independent instructions behind the branch instruction so that a microprocessor that employs the instruction queue may execute the independent instructions until instructions specified by the branch instruction are fetched, thereby improving the operating efficiency of the microprocessor.

In order to accomplish the object, the present invention provides an instruction queue having a dependence detector, a branch instruction detector, an order controller, and a mask. The dependence detector detects data dependence between an instruction to be written into an instruction memory and instructions presently stored in the instruction memory. The branch instruction detector determines whether or not the instruction to be written into the instruction memory is a branch instruction. If the branch instruction detector detects a branch instruction, the order controller refers to the data dependence detected by the dependence detector, to find out instructions that are independent of the branch instruction among the instructions stored in the instruction memory. The order controller puts the independent instructions behind the branch instruction so that the branch instruction may be read out of the instruction memory before the independent instructions. The mask excludes the independent instructions from the instructions that are in the instruction memory and are invalidated when the branch instruction is written into the instruction memory.

The order controller may consist of a dependence block and an order block. The dependence block generates branch instruction dependence data that clarifies dependence of the instructions stored in the instruction memory on the branch instruction, according to the branch instruction and the data dependence detected by the dependence detector. Whenever an instruction is read out of or written into the instruction memory, the order block determines the order of reading instructions out of the instruction memory and stores the instruction reading order. The order block changes the instruction reading order according to the branch instruction dependence data so that the branch instruction is read out of the instruction memory before the instructions that are independent of the branch instruction.

The dependence block may consist of a dependence memory, a dependence generator, a branch instruction dependence provider, and a specifier. The dependence memory stores dependence data. The dependence generator generates dependence data according to the dependence data stored in the dependence memory and the data dependence provided by the dependence detector and stores the generated dependence data in the dependence memory. The branch instruction dependence provider provides the branch instruction dependence data for the instructions stored in the instruction memory, according to the dependence data stored in the dependence memory and a signal informing of detection of the branch signal. The specifier specifies a location in the dependence memory to store the dependence data generated by the dependence generator according to the data dependence provided by the dependence detector.

The order block may consist of an order memory, a fore instruction data provider, a hind instruction data provider, an input controller, and a read select signal generator. The order memory stores order data that determines the order of reading instructions out of the instruction memory and specifies a write address in the instruction memory. The fore instruction data provider provides the order memory with fore instruction data for the instructions stored in the instruction memory. The hind instruction data provider provides the order memory with hind instruction data for the instructions stored in the instruction memory. The input controller controls the storing of the fore and hind instruction data into the order memory and changes the order data in the order memory to change the order of reading instructions out of the instruction memory. The read select signal generator generates a read select signal according to the order data stored in the order memory. The read select signal is used to select an instruction to be read out of the instruction memory.

DETAILED DESCRIPTION OF THE EMBODIMENTS

Figure 3:
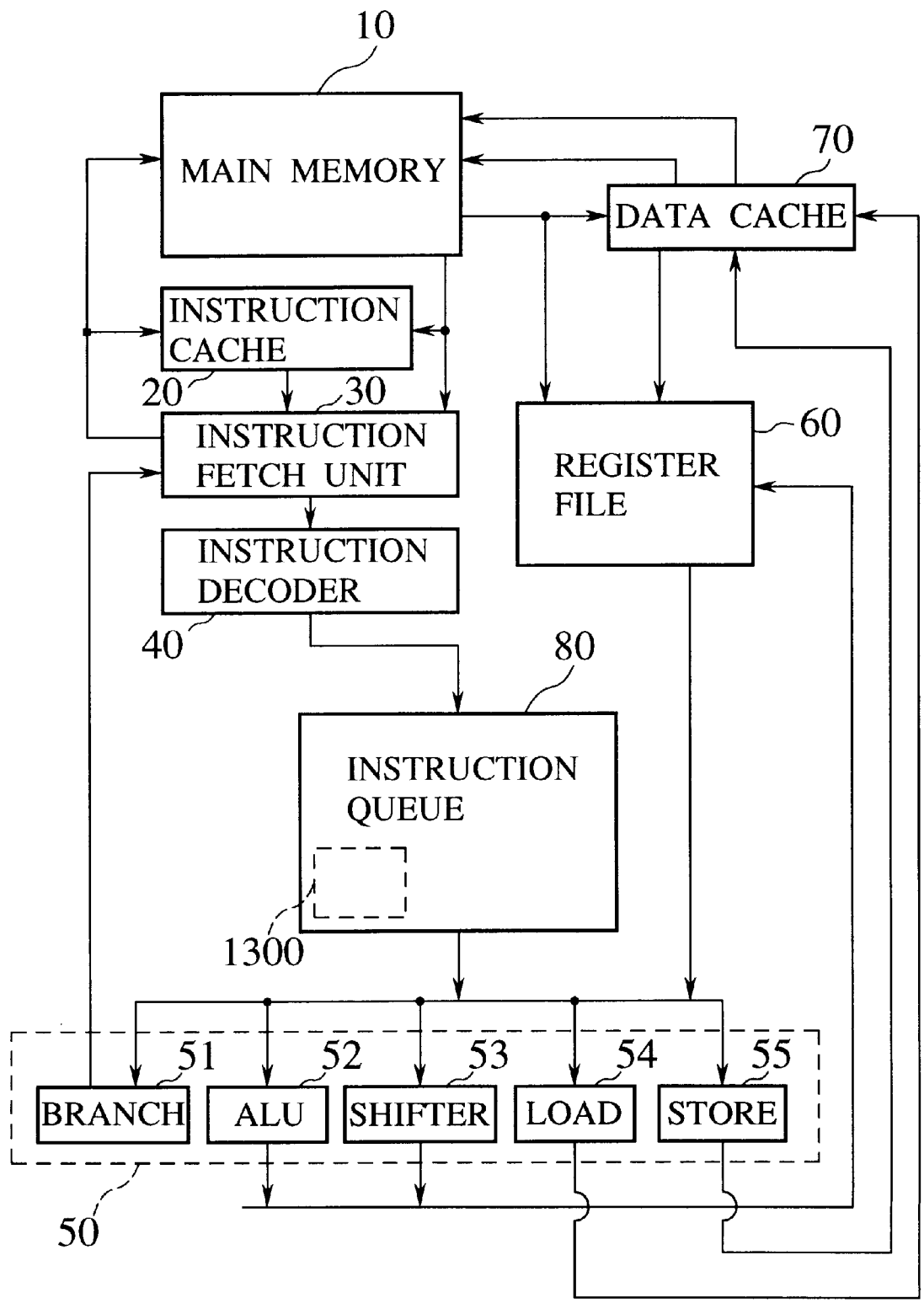
FIG. 3 shows a microprocessor having an instruction queue according to an embodiment of the present invention.

FIG. 3 shows a microprocessor having an instruction queue according to an embodiment of the present invention. The microprocessor is a single pipeline RISC processor.

A main memory 10 stores instructions and data. An instruction cache 20 temporarily stores some of the instructions stored in the main memory 10 and is accessible at a high speed. An instruction fetch unit 30 fetches an instruction from the main memory 10 or from the cache 20. An instruction decoder 40 decodes an instruction transferred from the fetch unit 30 into an executable instruction. An execution unit 50 executes the executable instruction sent from the decoder 40. A register file 60 stores data required for executing an instruction. A data cache 70 stores part of data stored in the main memory 10 and is accessible at a high speed. The fetch unit 30, decoder 40, and execution unit 50 form a pipeline that simultaneously handles a plurality of instructions.

Components of the execution unit 50 will be explained. A branch unit 51 executes a branch instruction. An ALU 52 executes an arithmetic instruction or a logic instruction. A shifter 53 executes a shift instruction. A load unit 54 executes a load instruction. A store unit 55 executes a store instruction. The execution unit 50 loads and stores data with respect to the register file 60 and the data cache 70.

An instruction queue 80 is arranged between the decoder 40 and the execution unit 50. The queue 80 serves as a buffer. Variable-length instructions involve different fetch times, and therefore, the decoder 40 sometimes unable to continuously supply executable instructions to the execution unit 50. Accordingly, the queue 80 functions to temporarily store and continuously supply executable instructions to the execution unit 50, to improve the performance of the microprocessor.

Figure 1:
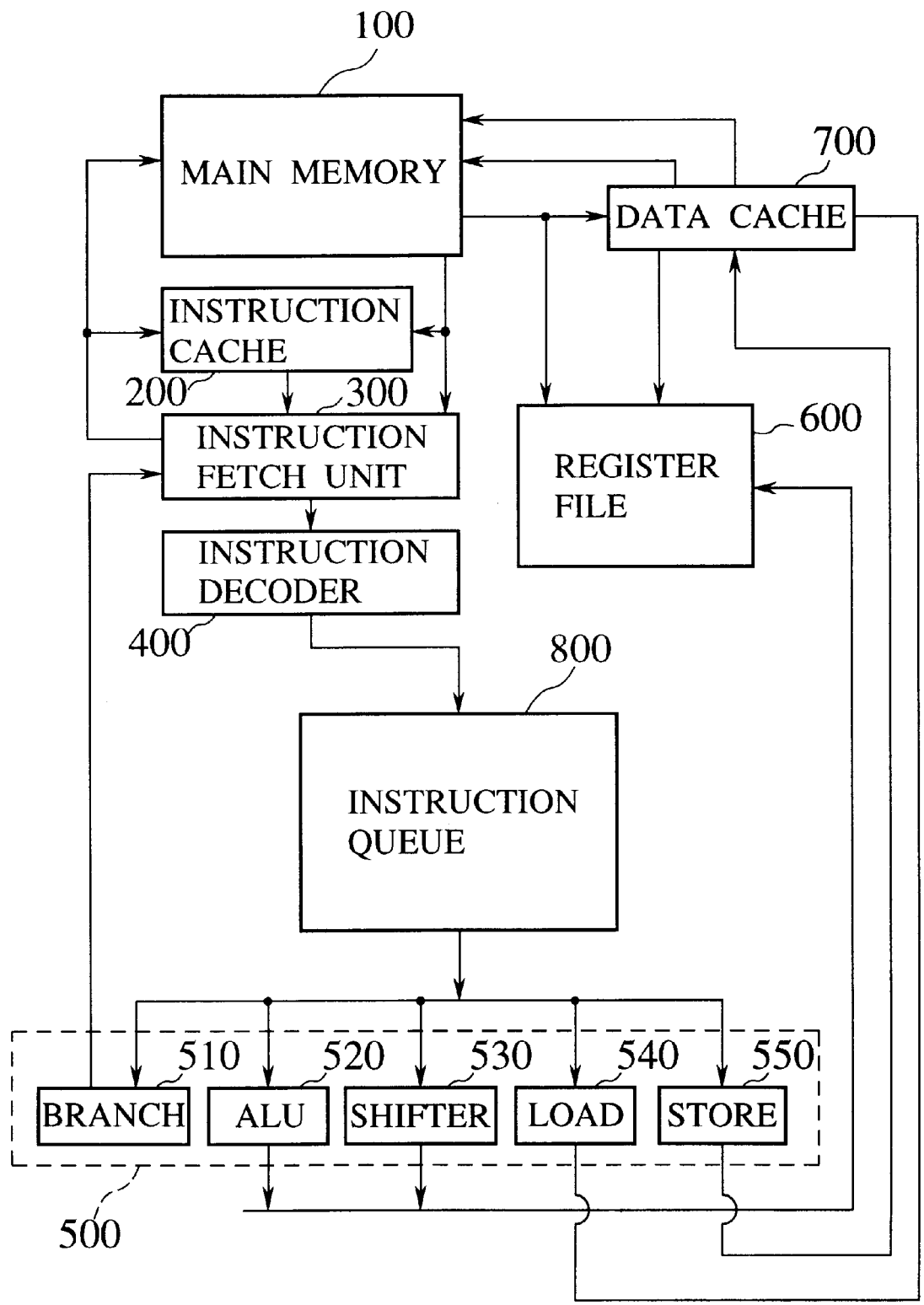
FIG. 1 shows a microprocessor having an instruction queue according to a prior art.
Figure 2:
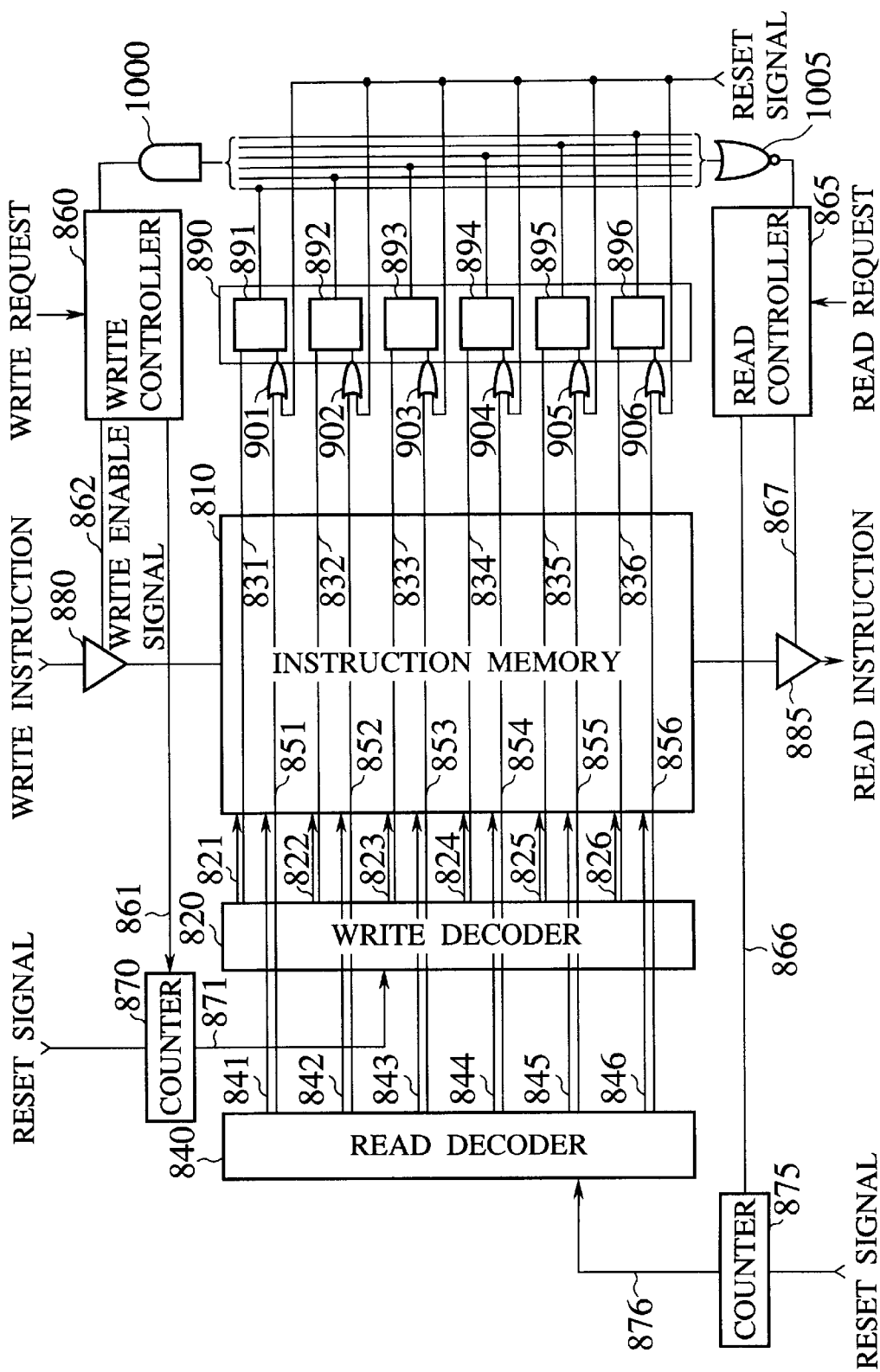
FIG. 2 shows an example of the instruction queue of FIG. 1.
Figure 4:
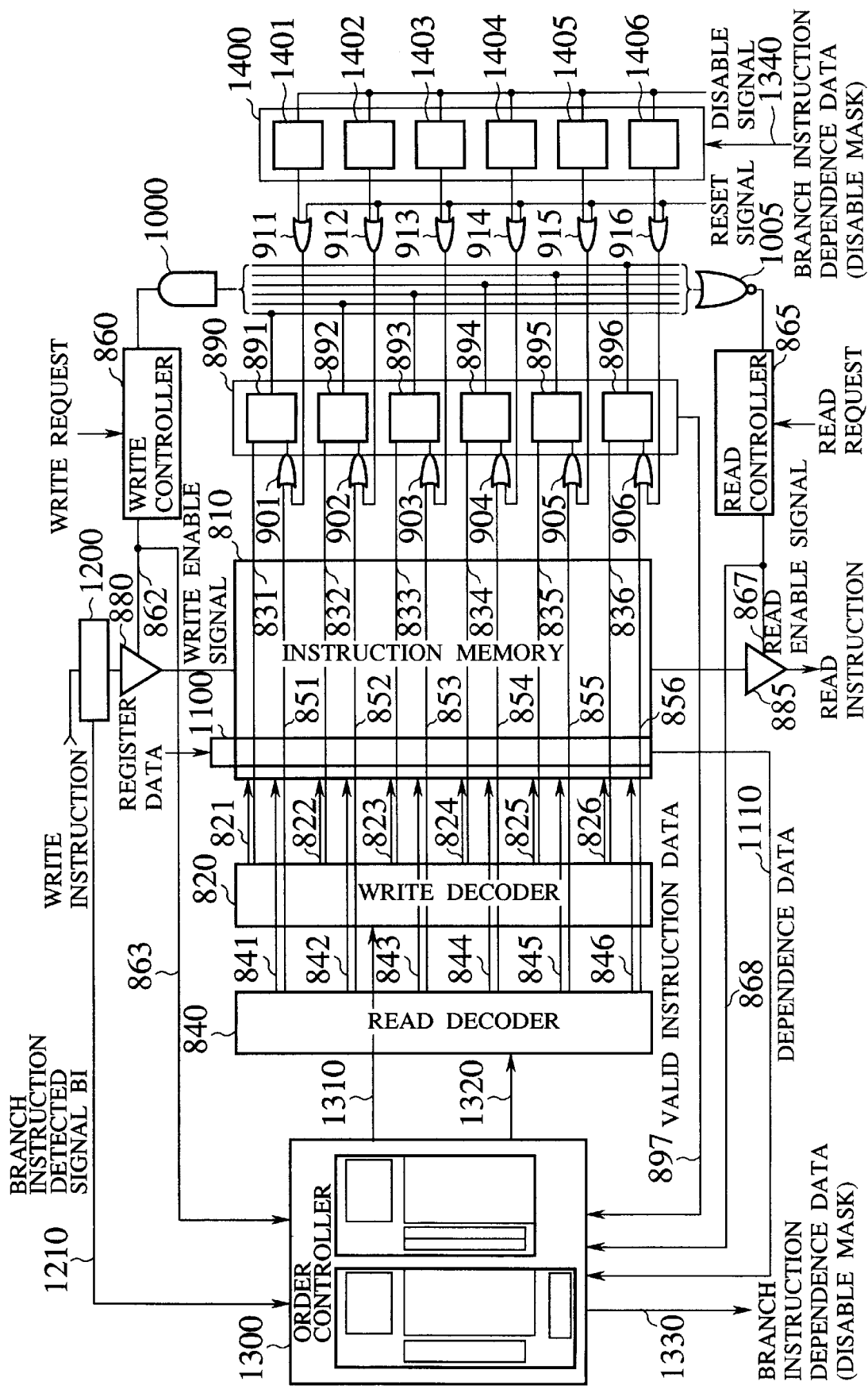
FIG. 4 shows the details of the instruction queue of FIG. 3.

FIG. 4 shows the details of the queue 80. In the figure, the same reference numerals as those of the prior art of FIG. 2 represent like parts, and they are not explained again.

The queue 80 does not have the write address counter 870 and read address counter 875 of the prior art. A dependence detector 1100 compares destination register numbers specified by the instruction codes of instructions stored in an instruction memory 810 with source and destination register numbers specified by the instruction code of an instruction to be stored in the instruction memory 810, to detect data dependence between them. A branch instruction detector 1200 determines whether or not the instruction to be written into the instruction memory 810 is a branch instruction. An order controller 1300 provides the functions of the counters 870 and 875 of the prior art and controls the order of reading instructions out of the instruction memory 810 so that instructions that are independent of a branch instruction are read after the branch instruction. A mask 1400 keeps the independent instructions in the instruction memory 810 when the contents of the instruction memory 810 are invalidated in response to the writing of the branch instruction into the instruction memory 810.

When the decoder 40 provides the queue 80 with an instruction and a write request, the dependence detector 1100 checks the dependence of valid instructions stored in the instruction memory 810 on the instruction to be written. A result of the checking is transferred to the order controller 1300 through a line 1110. At this time, the detector 1100 compares the source and destination register data of the instruction to be written with the destination register data of the valid instructions in the instruction memory 810.

Comparing the source register data of the instruction to be written with the destination register data of the valid instructions is to detect a read after write (RAW) hazard. Comparing the destination register data of the instruction to be written with the destination register data of the valid instructions is to detect a write after read (WAR) hazard and a write after write (WAW) hazard.

The branch instruction detector 1200 checks the operation code of the instruction to be written into the instruction memory 810. If the instruction is a branch instruction, the detector 1200 provides a branch instruction detected signal BI to the order controller 1300 through a line 1210.

When a given instruction is written into the instruction memory 810, the order controller 1300 writes dependence data provided by the dependence detector 1100 into a location corresponding to an address of the instruction memory at which the instruction has been written. The dependence data is valid until the instruction in question is read out of the instruction memory 810, or until the instruction is invalidated with a disable signal provided by the execution unit 50 due to branching, etc.

A validity memory 890 provides the order controller 1300 with validity data through a line 897. The validity data indicates valid instructions in the instruction memory 810.

The order controller 1300 holds order data for the valid instructions in the instruction memory 810. The order data indicates the order of reading the instructions from the memory 810. The order data is created by the order controller 1300 in response to a write enable signal provided by a write controller 860 and based on an address of the memory 810 specified by the order controller 1300.

More precisely, order data for an instruction just written into the instruction memory 810 indicates lowest read priority, and order data for instructions already stored in the memory 810 indicates higher priority than the just written instruction.

When a read controller 865 provides a read enable signal through a line 868, the order controller 1300 specifies a read address according to the order data. The validity memory 890 provides the addresses of valid instructions in the instruction memory 810 through the line 897. If a given instruction in the instruction memory 810 is invalid, the order data for the instruction is also invalid.

When the branch instruction detector 1200 provides the signal BI to indicate the reception of a branch instruction, the order controller 1300 refers to the stored dependence data and creates dependence data for the branch instruction and valid instructions stored in the instruction memory 810. When the branch instruction is written into the instruction memory 810, the order controller 1300 stores order data indicating that the branch instruction has lowest priority and that the instructions already stored in the instruction memory 810 have higher priority than the branch instruction. The order data is changed so that some of the instructions in the instruction memory 810 that are independent of the branch instruction are read after the branch instruction.

Namely, any instruction stored in the queue 80 that has no data dependence on a given branch instruction is read after the branch instruction.

The prior art of FIG. 2 zeroes the validity memory 890 to invalidate the contents of the instruction memory 810 in response to a reset signal that is generated when a branch instruction is written into the instruction memory 810. On the other hand, when a branch instruction is given, the present invention preserves some instructions that are independent of the branch instruction and puts them behind the branch instruction in the instruction memory 810 so that the independent instructions may be read after the branch instruction. For this purpose, validity data in the validity memory 890 for these independent instructions must not be cleared in response to the branch instruction.

The mask 1400 is arranged for this purpose. The mask 1400 receives branch instruction dependence data from the order controller 1300 and sets some of sections 1401 to 1406 of the mask 1400 corresponding to the instructions that are independent of the branch instruction, to thereby exclude these instructions from the clearing operation of the validity memory 890.

These preserved independent instructions are read and executed after the branch instruction.

The dependence detector 1100 is realized by standardizing the register code region of each instruction code and by employing a CAM (content addressable memory) as a part for storing destination register codes in the instruction memory 810 so that columns of bits are retrievable.

The branch instruction detector 1200 is realized with a comparator that compares the operation code of an instruction to be written into the instruction memory 810 with each of predetermined branching operation codes. The mask 1400 is realized with AND gates for receiving the branch instruction dependence data and disable signals and flip-flops controlled by the outputs of the AND gates.

The order controller 1300 will be explained.

Figure 5:
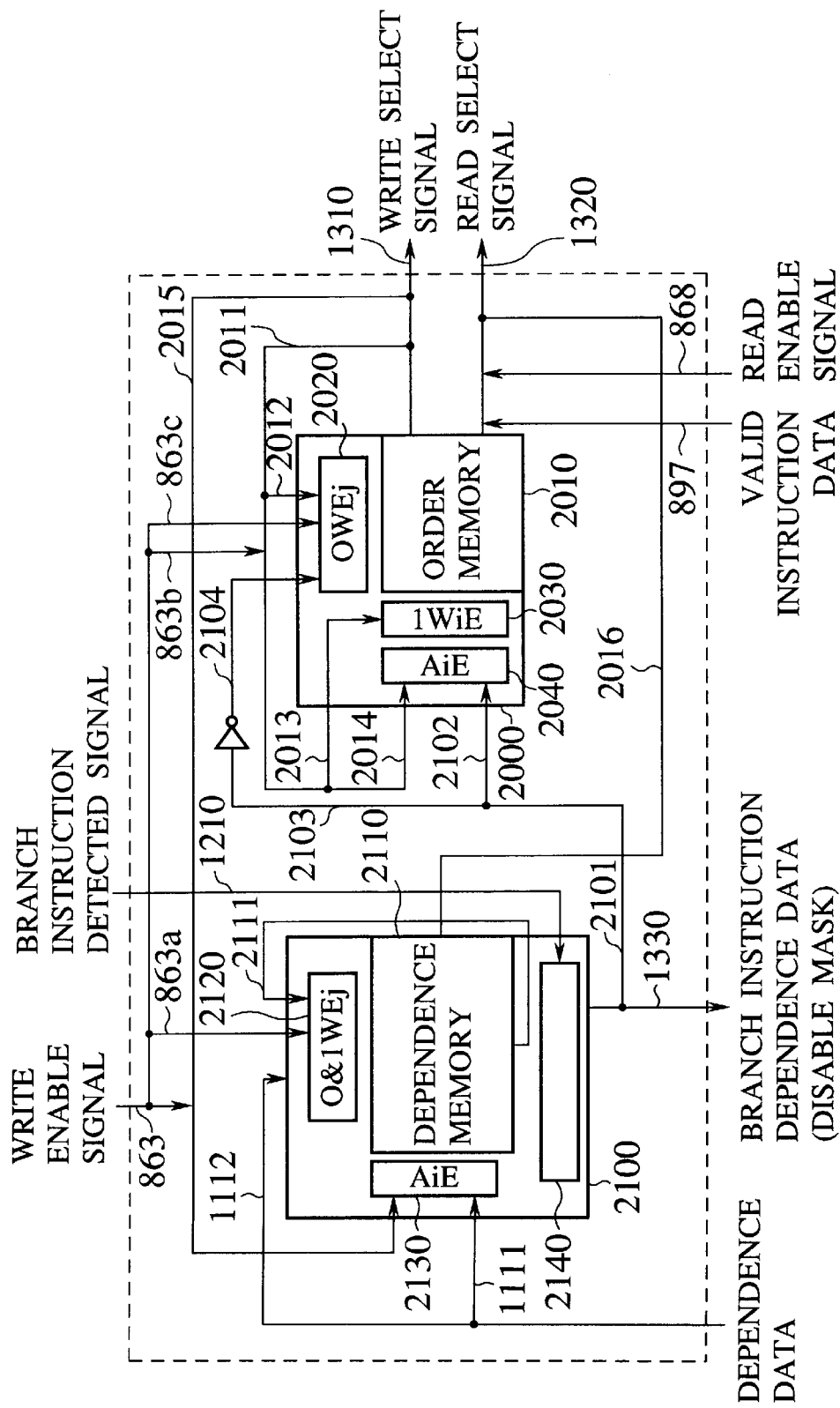
FIG. 5 shows an order controller contained in the instruction queue of FIG. 4.

FIG. 5 is a general view showing the order controller 1300. The order controller 1300 mainly consists of an order block 2000 and a dependence block 2100. The order block 2000 holds order data and provides a read decoder 840 and a write decoder 820 with data for specifying an address in the instruction memory 810. The dependence block 2100 refers to dependence data provided by the dependence detector 1100, stores dependence data for each valid instruction stored in the instruction memory 810, and supplies branch instruction dependence data to the mask 1400 and order block 2000.

The order block 2000 will be explained.

An order memory 2010 stores order data for each address of the instruction memory 810. A fore instruction data provider 2020 provides fore instruction data to each column of the order memory 2010. A hind instruction data provider 2030 provides hind instruction data to each row of the order memory 2010. An input controller 2040 controls the writing of data provided by the data providers 2020 and 2030 into the order memory 2010. A read select signal generator 2050 (FIG. 6) provides the read decoder 840 with a read select signal according to the order data stored in the order controller 1300.

The numbers of rows and columns of the order memory 2010 are determined based on the maximum number of instructions stored in the instruction memory 810. In this embodiment, the instruction memory 810 stores six instructions at the maximum, and therefore, the order memory 2010 consists of six rows and six columns.

Figure 6:
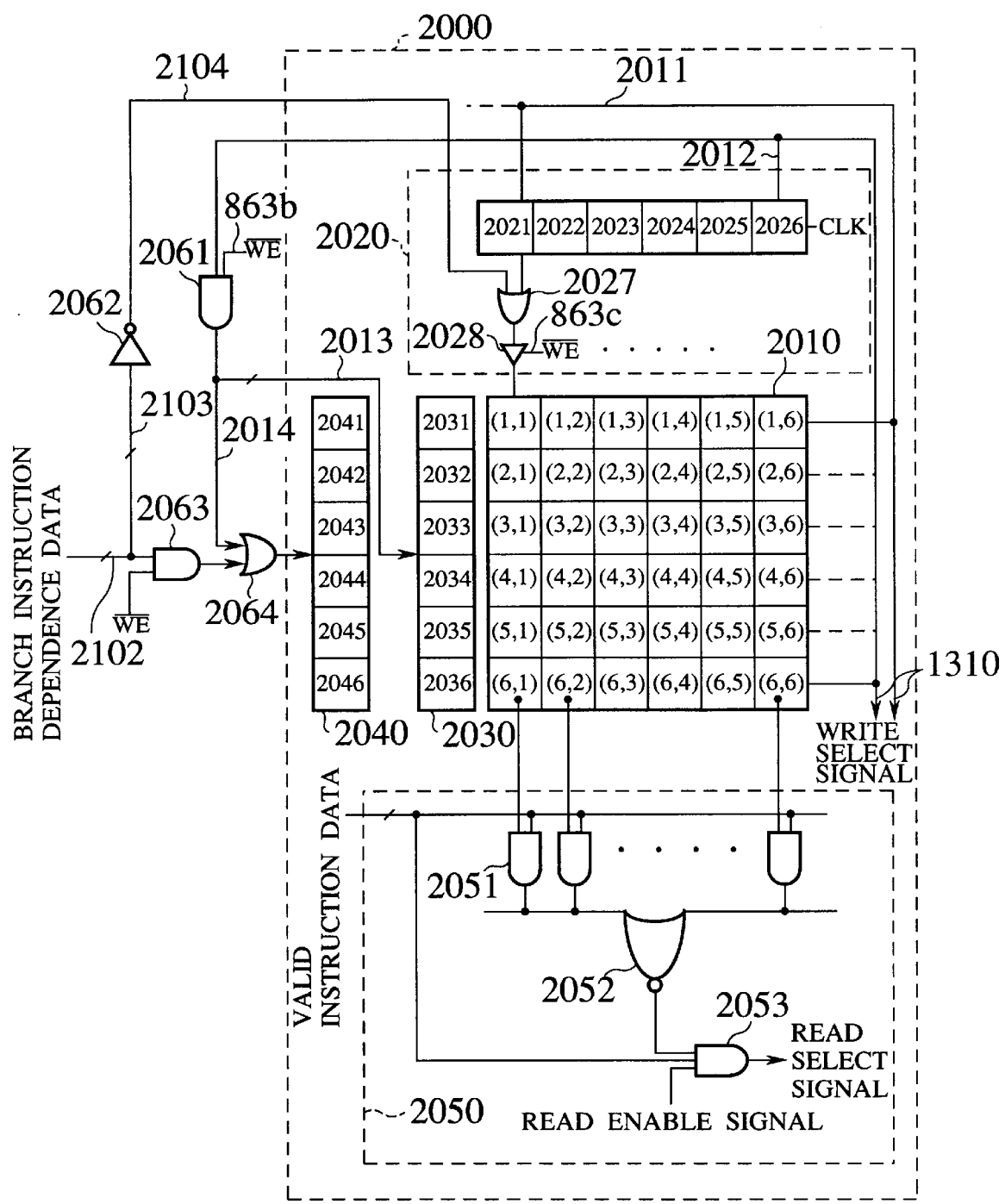
FIG. 6 shows an order block contained in the order controller of FIG. 5.

FIG. 6 shows the details of the order block 2000.

Each row of the order memory 2010 holds order data for a corresponding instruction stored in the instruction memory 810. For the sake of simplicity of explanation, it is assumed that the instruction memory 810 has instruction storage addresses 1 to 6. Rows 1 to 6 of the order memory 2010 correspond to the addresses 1 to 6 of the instruction memory 810, respectively. Each cell in, for example, the row 1 is expressed as (1, *). If a cell (2, 3) in the row 2 is 1, it means that an instruction stored at the address 2 is behind an instruction stored at the address 3. If the cell (2, 3) is 0, the instruction at the address 2 is prior to the instruction at the address 3.

Six logic gate sets each including logic gates 2027, 2028, 2051, 2061, 2062, 2063, and 2064 are arranged for the order memory 2010. The row 1 of the order memory 2010 is connected to a storage area 2021 of the fore instruction data provider 2020 through a line 2011. Similarly, the row 2 is connected to a storage area 2022, the row 3 to a storage area 2023, and so on.

The operation of the order memory 2010 will be explained.

The input controller 2040 provides "1" to allow data to be written into a corresponding row of the order memory 2010 and "0" to prohibit the same. It is assumed that the input controller 2040 provides "1" for every row of the order memory 2010 and that the format of the order memory 2010 is as follows:

| | | | | | |
|---|---|---|---|---|---|
| 000000(1, 1) | (1, 2) | (1, 3) | (1, 4) | (1, 5) | (1, 6) |
| 000000(2, 1) | (2, 2) | (2, 3) | (2, 4) | (2, 5) | (2, 6) |
| 000000(3, 1) | (3, 2) | (3, 3) | (3, 4) | (3, 5) | (3, 6) |
| 000000(4, 1) | (4, 2) | (4, 3) | (4, 4) | (4, 5) | (4, 6) |
| 000000(5, 1) | (5, 2) | (5, 3) | (5, 4) | (5, 5) | (5, 6) |
| 000000(6, 1) | (6, 2) | (6, 3) | (6, 4) | (6, 5) | (6, 6) |

If (1, 3)=1 and the other cells are each 0, then the order memory 2010 is expressed as follows:

| | | | | | |
|---|---|---|---|---|---|
| 001000(1, 1) | (1, 2) | (1, 3) | (1, 4) | (1, 5) | (1, 6) |
| 000000(2, 1) | (2, 2) | (2, 3) | (2, 4) | (2, 5) | (2, 6) |
| 000000(3, 1) | (3, 2) | (3, 3) | (3, 4) | (3, 5) | (3, 6) |
| 000000(4, 1) | (4, 2) | (4, 3) | (4, 4) | (4, 5) | (4, 6) |
| 000000(5, 1) | (5, 2) | (5, 3) | (5, 4) | (5, 5) | (5, 6) |
| 000000(6, 1) | (6, 2) | (6, 3) | (6, 4) | (6, 5) | (6, 6) |

The order memory 2010 is reset to the following initial state:

| | | | | | |
|---|---|---|---|---|---|
| 011111(1, 1) | (1, 2) | (1, 3) | (1, 4) | (1, 5) | (1, 6) |
| 001111(2, 1) | (2, 2) | (2, 3) | (2, 4) | (2, 5) | (2, 6) |
| 000111(3, 1) | (3, 2) | (3, 3) | (3, 4) | (3, 5) | (3, 6) |
| 000011(4, 1) | (4, 2) | (4, 3) | (4, 4) | (4, 5) | (4, 6) |
| 000001(5, 1) | (5, 2) | (5, 3) | (5, 4) | (5, 5) | (5, 6) |
| 000000(6, 1) | (6, 2) | (6, 3) | (6, 4) | (6, 5) | (6, 6) |

In the initial state, the instruction memory 810 is empty. This initial state indicates that an instruction corresponding to the row 6 has highest priority, and the priority decreases in order of the rows 5, 4, 3, 2, and 1.

A write operation will be explained.

The order controller 1300 provides a write select signal through a line 1310 based on a row of the order memory 2010 having cells of each 0. In the above initial state, the row 6 has "0" in each cell. Accordingly, the write select signal indicates the address 6 that corresponds to the row 6. According to the write select signal, an instruction is written into the address 6 in the instruction memory 810. At the same time, an area 2036 of the hind instruction data provider 2030 corresponding to the row 6 receives "1" to write "1" into each cell (6, *) of the row 6. This indicates that the newly written instruction is the last valid instruction in the instruction memory 810.

To write "1" into a proper area (the area 2036 in the above example) of the hind instruction data provider 2030, the write select signal is used. Namely, the write select signal is supplied to the data provider 2030 through a line 2011, an AND gate 2061, and a line 2013 in synchronization with a write enable signal supplied through a line 863b.

At this moment, instructions corresponding to the rows 1 to 5 must have data indicating that they are prior to the instruction corresponding to the row 6. This is made by writing "0" in cells (*, 6) in the column 6 of the order memory 2010. To achieve this, "1" is written into an area 2026 of the fore instruction data provider 2020 so that "0" is written into the cells (*, 6) in the column 6 in response to an inversion of the write enable signal supplied to the buffer 2028 through a line 863C.

Then, the order memory 2010 is as follows:

| | | | | | |
|---|---|---|---|---|---|
| 011110(1, 1) | (1, 2) | (1, 3) | (1, 4) | (1, 5) | (1, 6) |
| 001110(2, 1) | (2, 2) | (2, 3) | (2, 4) | (2, 5) | (2, 6) |
| 000110(3, 1) | (3, 2) | (3, 3) | (3, 4) | (3, 5) | (3, 6) |
| 000010(4, 1) | (4, 2) | (4, 3) | (4, 4) | (4, 5) | (4, 6) |
| 000000(5, 1) | (5, 2) | (5, 3) | (5, 4) | (5, 5) | (5, 6) |
| 111110(6, 1) | (6, 2) | (6, 3) | (6, 4) | (6, 5) | (6, 6) |

Since each cell in the row 5 is "0," a write select signal specifying the address 5 of the instruction memory 810 is provided in the next write operation. If an instruction is written at the address 5 in the same manner as at the address 6, the order memory 2010 will be as follows:

| | | | | | |
|---|---|---|---|---|---|
| 011100(1, 1) | (1, 2) | (1, 3) | (1, 4) | (1, 5) | (1, 6) |
| 001100(2, 1) | (2, 2) | (2, 3) | (2, 4) | (2, 5) | (2, 6) |
| 000100(3, 1) | (3, 2) | (3, 3) | (3, 4) | (3, 5) | (3, 6) |
| 000000(4, 1) | (4, 2) | (4, 3) | (4, 4) | (4, 5) | (4, 6) |
| 111101(5, 1) | (5, 2) | (5, 3) | (5, 4) | (5, 5) | (5, 6) |
| 111100(6, 1) | (6, 2) | (6, 3) | (6, 4) | (6, 5) | (6, 6) |

Each cell in the row 4 has "0." If an instruction is written at the address 4 in the instruction memory 810, the order memory 2010 will be as follows:

| | | | | | |
|---|---|---|---|---|---|
| 011000(1, 1) | (1, 2) | (1, 3) | (1, 4) | (1, 5) | (1, 6) |
| 001000(2, 1) | (2, 2) | (2, 3) | (2, 4) | (2, 5) | (2, 6) |
| 000000(3, 1) | (3, 2) | (3, 3) | (3, 4) | (3, 5) | (3, 6) |
| 111011(4, 1) | (4, 2) | (4, 3) | (4, 4) | (4, 5) | (4, 6) |
| 111001(5, 1) | (5, 2) | (5, 3) | (5, 4) | (5, 5) | (5, 6) |
| 111000(6, 1) | (6, 2) | (6, 3) | (6, 4) | (6, 5) | (6, 6) |

Each cell in the row 3 has "0." If an instruction is written at the address 3 in the instruction memory 810, the order memory 2010 will be as follows:

| | | | | | |
|---|---|---|---|---|---|
| 010000(1, 1) | (1, 2) | (1, 3) | (1, 4) | (1, 5) | (1, 6) |
| 000000(2, 1) | (2, 2) | (2, 3) | (2, 4) | (2, 5) | (2, 6) |
| 110111(3, 1) | (3, 2) | (3, 3) | (3, 4) | (3, 5) | (3, 6) |
| 110011(4, 1) | (4, 2) | (4, 3) | (4, 4) | (4, 5) | (4, 6) |
| 110001(5, 1) | (5, 2) | (5, 3) | (5, 4) | (5, 5) | (5, 6) |
| 110000(6, 1) | (6, 2) | (6, 3) | (6, 4) | (6, 5) | (6, 6) |

Each cell in the row 2 has "0." If an instruction is written at the address 2 in the instruction memory 810, the order memory 2010 will be as follows:

| | | | | | |
|---|---|---|---|---|---|
| 000000(1, 1) | (1, 2) | (1, 3) | (1, 4) | (1, 5) | (1, 6) |
| 101111(2, 1) | (2, 2) | (2, 3) | (2, 4) | (2, 5) | (2, 6) |
| 100111(3, 1) | (3, 2) | (3, 3) | (3, 4) | (3, 5) | (3, 6) |
| 100011(4, 1) | (4, 2) | (4, 3) | (4, 4) | (4, 5) | (4, 6) |
| 100001(5, 1) | (5, 2) | (5, 3) | (5, 4) | (5, 5) | (5, 6) |
| 100000(6, 1) | (6, 2) | (6, 3) | (6, 4) | (6, 5) | (6, 6) |

Each cell in the row 1 has "0." If an instruction is written at the address 1 in the instruction memory 810, the order memory 2010 will be as follows:

| | | | | | |
|---|---|---|---|---|---|
| 011111(1, 1) | (1, 2) | (1, 3) | (1, 4) | (1, 5) | (1, 6) |
| 001111(2, 1) | (2, 2) | (2, 3) | (2, 4) | (2, 5) | (2, 6) |
| 000111(3, 1) | (3, 2) | (3, 3) | (3, 4) | (3, 5) | (3, 6) |
| 000011(4, 1) | (4, 2) | (4, 3) | (4, 4) | (4, 5) | (4, 6) |
| 000001(5, 1) | (5, 2) | (5, 3) | (5, 4) | (5, 5) | (5, 6) |
| 000000(6, 1) | (6, 2) | (6, 3) | (6, 4) | (6, 5) | (6, 6) |

In this way, the order memory 2010 stores order data for instructions stored in the instruction memory 810. An address corresponding to a row whose cells have each "0" is used as a read address, to form an FIFO. This technique is known as a least recently used (LRU) method, which is described in "bit" Vol. 15, No. 4, pp. 327 to 328.

The present invention adds new functions to this technique. The above technique may function when write and read operations alternate with the instruction memory 810 being continuously filled with instructions. The above technique, however, will not properly function if a read request is made when the instruction memory 810 is empty, or if read requests consecutively occur. In addition, the above technique is incapable of changing order of instructions.

The read select signal generator 2050 of the present invention has an additional read function. The generator 2050 has AND gates 2051 and 2053 and a NOR gate 2052. Although the generator 2050 is attached to the row 6 in FIG. 6, it is actually attached to every row of the order memory 2010. The NOR gate 2052 is a zero detector.

The AND gates 2051 receive order data from the order memory 2010 and validity data from the validity memory 890. If a given instruction stored in the instruction memory 810 is invalid, validity data supplied to the corresponding row of the order memory 2010 is "0" to zero each of the AND gates 2051. Namely, rows of the order memory 2010 corresponding to invalid instructions are masked so that order data is prepared only for valid instructions.

If an instruction is written into the instruction memory 810 that is empty and if a read request is made at once, each cell in a corresponding row of the order memory 2010 has 1 except the cell related to the row itself. At this time, the outputs of the AND gates 2051 are each "0" due to validity data, and therefore, the NOR gate 2052 provides "1." The AND gate 2053 calculates an AND of the output of the NOR gate 2052, the validity data, and a read enable signal and provides a read select signal to meet the read request.

The reason why the AND gate 2053 employs the validity data in addition to the read enable signal is because the NOR gate 2052 of the next row having "0" in every cell thereof will provide "1" if validity data for the row shows invalidness. In this case, the NOR gates 2052 of the consecutive two rows provide each "1." The validity data to the AND gates 2053 of the two rows serves to select a valid one of the two rows.

If the row having "0" in every cell thereof corresponds to a valid instruction stored in the instruction memory 810, a read address is identical to a write address. In this case, only the NOR gate 2052 of the row in question provides "1."

In this way, the order memory 2010 is adaptable to the number of valid instructions.

The order data stored in the order memory 2010 must be changed depending on situations. For this purpose, an inversion of branch instruction dependence data is supplied to the fore instruction data provider 2020 through an inverter gate 2062, a line 2104, and an OR gate 2027. The branch instruction dependence data is also supplied to the input controller 2040.

A technique of putting instructions that are independent of a branch instruction behind the branch instruction will be explained. It is supposed that the order memory 2010 is in the following state:

| | | | | | |
|---|---|---|---|---|---|
| 011110(1, 1) | (1, 2) | (1, 3) | (1, 4) | (1, 5) | (1, 6) |
| 001110(2, 1) | (2, 2) | (2, 3) | (2, 4) | (2, 5) | (2, 6) |
| 000110(3, 1) | (3, 2) | (3, 3) | (3, 4) | (3, 5) | (3, 6) |
| 000010(4, 1) | (4, 2) | (4, 3) | (4, 4) | (4, 5) | (4, 6) |
| 000000(5, 1) | (5, 2) | (5, 3) | (5, 4) | (5, 5) | (5, 6) |
| 111110(6, 1) | (6, 2) | (6, 3) | (6, 4) | (6, 5) | (6, 6) |

Then, a branch instruction is going to be written at the address 5 in the instruction memory 810 corresponding to the row 5 of the order memory 2010. It is supposed that the other addresses of the instruction memory 810 have valid instructions and that the instructions stored at the addresses 2 and 4 are independent of the branch instruction. These independent instructions must be put behind the branch instruction.

A request for writing the branch instruction occurs in a second half period. Since cells (5, *) in the row 5 of the order memory 2010 have each "0," a write enable signal from the order controller 1300 specifies the address 5 to store the branch instruction. Once the branch instruction is stored at the address 5 in the instruction memory 810, the hind instruction data provider 2030 makes the order memory 2010 as follows:

| | | | | | |
|---|---|---|---|---|---|
| 011110(1, 1) | (1, 2) | (1, 3) | (1, 4) | (1, 5) | (1, 6) |
| 001110(2, 1) | (2, 2) | (2, 3) | (2, 4) | (2, 5) | (2, 6) |
| 000110(3, 1) | (3, 2) | (3, 3) | (3, 4) | (3, 5) | (3, 6) |
| 000010(4, 1) | (4, 2) | (4, 3) | (4, 4) | (4, 5) | (4, 6) |
| 111111(5, 1) | (5, 2) | (5, 3) | (5, 4) | (5, 5) | (5, 6) |
| 111110(6, 1) | (6, 2) | (6, 3) | (6, 4) | (6, 5) | (6, 6) |

In a usual operation, the fore instruction data provider 2020 writes "0" into each cell in the column 5 so that each cell in the row 4 has "0" to make an instruction stored at the address 4 in the instruction memory 810 ready to be read. However, the instruction at the address 4 must be read after the branch instruction written at the address 5.

Namely, the fore instruction data provider 2020 must exclude cells (2, 5) and (4, 5) when writing "0" into the column 5 so that the instructions at the addresses 2 and 4 are read after the branch instruction at the address 5. Only thereafter, "1" in the cells (2, 5) and (4, 5) must be cleared.

Instructions other than the instructions at the addresses 2 and 4 must be executed first. For this purpose, the fore instruction data provider 2020 writes "0" into the columns 2 and 4 in addition to the column 5. At this time, the cells (2, 2), (2, 4), (4, 2), and (4, 4) must be masked so that the instructions at the addresses 2 and 4 are read after the branch instruction.

These operations are easy to carry out for the arrangement of FIG. 6. Namely, when writing "0" in the columns 2, 4, and 5, the rows 2 and 4 are masked to maintain their order data. As a result, the order memory 2010 will be as follows:

Writing "0"
↓ ↓↓

| | | | | | |
|---|---|---|---|---|---|
| 001000(1, 1) | (1, 2) | (1, 3) | (1, 4) | (1, 5) | (1, 6) |
| 001110(2, 1) | (2, 2) | (2, 3) | (2, 4) | (2, 5) | (2, 6) |
| 000000(3, 1) | (3, 2) | (3, 3) | (3, 4) | (3, 5) | (3, 6) |
| 000010(4, 1) | (4, 2) | (4, 3) | (4, 4) | (4, 5) | (4, 6) |
| 101001(5, 1) | (5, 2) | (5, 3) | (5, 4) | (5, 5) | (5, 6) |
| 101000(6, 1) | (6, 2) | (6, 3) | (6, 4) | (6, 5) | (6, 6) |

Since each cell in the row 3 is "0," the instruction corresponding to the row 3 is read by jumping the instruction corresponding to the row 4. If an instruction is written at the address 3, related order data is written into the row 3, and "0" is written into the column 3. Thereafter, the instruction corresponding to the row 2 is skipped, and the instruction corresponding to the row 1 is read. Then, the instruction corresponding to the row 6 is read.

Any instruction newly written during the above operation receives the lowest read priority. Namely, the newly written instructions will be read after the instructions corresponding to the rows 2 and 4 that have been put behind the branch instruction. After the instruction stored at the address 6 corresponding to the row 6 is read, the branch instruction at the address 5 corresponding to the row 5 is read. Then, the instruction at the address 4 corresponding to the row 4 is read, and the instruction at the address 3 corresponding to the row 3. In this way, instructions that are independent of a given branch instruction are put behind the branch instruction.

Branch instruction dependence data provided by the dependence block 2100 is "1" to indicate dependence and "0" to indicate independence. This data is provided when "0" is written into a corresponding column of the order memory 2010 in response to a branch instruction.

To mask a given row, the input controller 2040 receives the branch instruction dependence data through the AND gate 2063 and OR gate 2064 when "0" is written into a corresponding column. Usually, the input controller 2040 provides "1" to each row when "0" is written into a given column. If a branch instruction is detected, the input controller 2040 provides "0" for any row corresponding to an instruction that is independent of the branch instruction, to allow no data to be written into the row.

An inversion of the branch instruction dependence data is supplied to the fore instruction data provider 2020 so that "0" is written into columns corresponding to instructions that are independent of the branch instruction when "0" is written into a column corresponding to a newly written instruction.

Although the above example puts two instructions behind a branch instruction, any number of instructions may be put behind a branch instruction.

In FIG. 6, the input controller 2040 receives the same data as the hind instruction data provider 2030 when writing "1" into a given row. If no branch instruction is detected, the data provider 2030 can specify by itself a row to write "1," and therefore, data provided through the AND gate 2061, line 2014, and OR gate 2064 will not be required.

The timing of writing order data will be summarized. The hind instruction data provider 2030 provides the order memory 2010 with data in synchronization with a write request signal that is generated in the second half of a given period of a clock signal. The fore instruction data provider 2020 provides the order memory 2010 with data in the first half of the next period of the clock signal.

A write select signal is supplied to both the fore and hind instruction data providers 2020 and 2030. The write select signal is temporarily stored in a corresponding one of the areas 2021 to 2026 of the fore instruction data provider 2020 in the first half of a period of the clock signal and is provided in the second half of the period. Branch instruction dependence data is provided only when a branch instruction is detected at the same timing as the data provided by the fore instruction data provider 2020.

Figure 7:
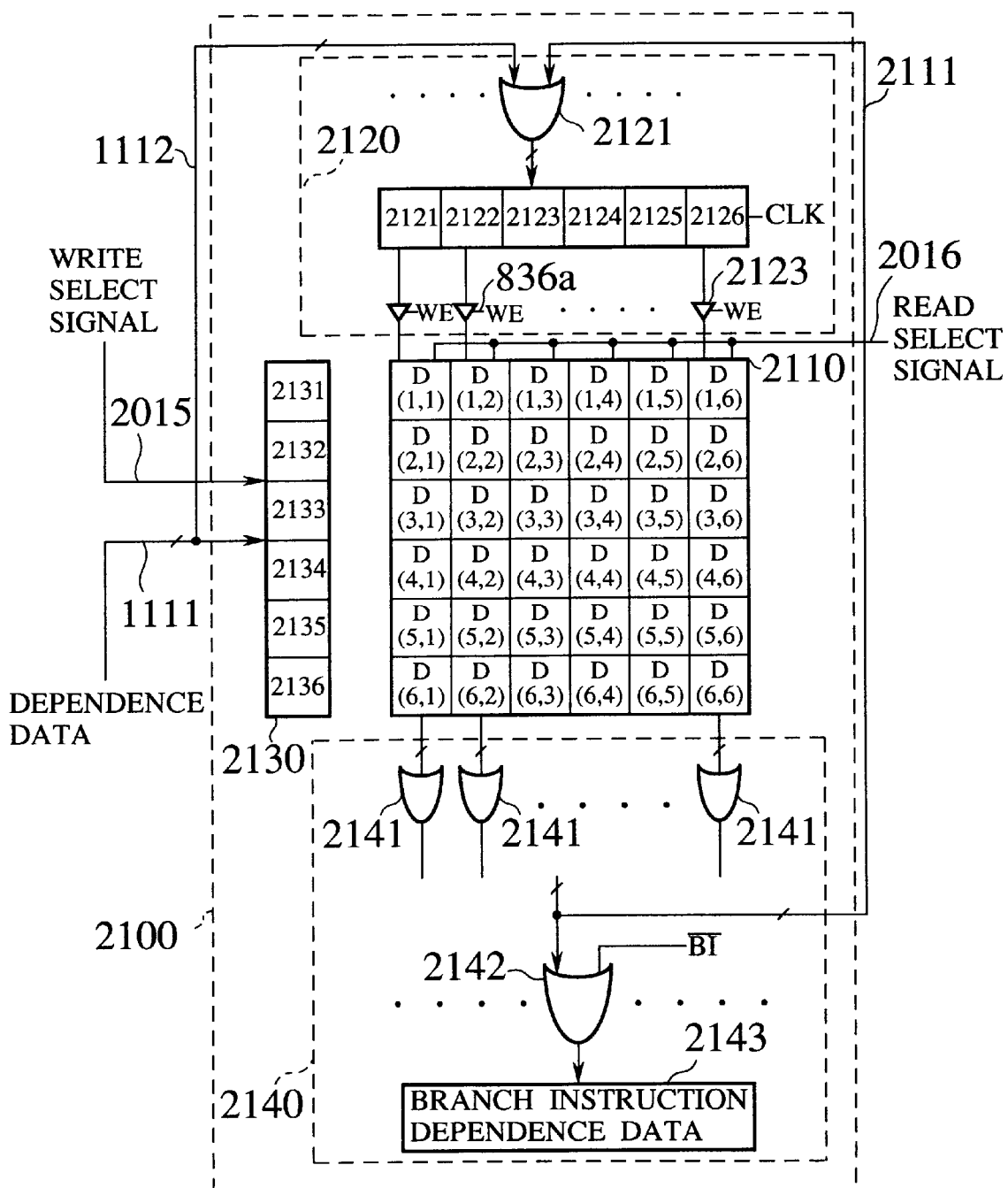
FIG. 7 shows a dependence block contained in the order controller of FIG. 5.

The dependence block 2100 will be explained with reference to FIG. 7.

A dependence memory 2110 stores dependence data for each instruction stored in the instruction memory 810. A branch instruction dependence provider 2140 has OR gates 2141 and 2142 and a latch circuit 2143. The OR gates 2141 provide each an OR of a corresponding column of the dependence memory 2110. When a branch instruction is detected, the OR gate 2142 provides an OR of the output of the OR gate 2141 and an inversion of the branch instruction detected signal BI, to generate branch instruction dependence data, which is supplied to the order block 2000. A specifier 2130 specifies a column for which the branch instruction dependence provider 2140 provides an OR, according to dependence data provided by the dependence detector 1100 through a line 1111. The specifier 2130 also specifies a row to which the dependence data is written. A dependence generator 2120 has OR gates 2121 that provide each an OR of the output of a corresponding one of the OR gates 2141 and the dependence data provided by the dependence detector 1100. The outputs of the OR gates 2121 are stored in storage areas 2121 to 2126, respectively. The storage areas supply their data to respective columns of the dependence memory 2110 through buffers 2123.

The OR gate 2142 is provided for each of the six OR gates 2141, to provide corresponding branch instruction dependence data. There are six OR gates 2121 for the six storage areas 2121 to 2126. Each OR gate 2121 receives corresponding dependence data and the output of the corresponding OR gate 2141.

Similar to the order memory 2010, the dependence memory 2110 is an array of 6 rows and 6 columns.

The rows 1 to 6 of the dependence memory 2110 correspond to the addresses 1 to 6 of the instruction memory 810, respectively.

The dependence memory 2110 has the following initial state with "0" in each cell:

| | | | | | |
|---|---|---|---|---|---|
| 000000D(1, 1), | D(1, 2), | D(1, 3), | D(1, 4), | D(1, 5), | D(1, 6) |
| 000000D(2, 1), | D(2, 2), | D(2, 3), | D(2, 4), | D(2, 5), | D(2, 6) |
| 000000D(3, 1), | D(3, 2), | D(3, 3), | D(3, 4), | D(3, 5), | D(3, 6) |
| 000000D(4, 1), | D(4, 2), | D(4, 3), | D(4, 4), | D(4, 5), | D(4, 6) |
| 000000D(5, 1), | D(5, 2), | D(5, 3), | D(5, 4), | D(5, 5), | D(5, 6) |
| 000000D(6, 1), | D(6, 2), | D(6, 3), | D(6, 4), | D(6, 5), | D(6, 6) |

If an instruction corresponding to the row 1 is dependent on an instruction corresponding to the row 2, the dependence memory 2110 is as follows:

| | | | | | |
|---|---|---|---|---|---|
| 010000D(1, 1), | D(1, 2), | D(1, 3), | D(1, 4), | D(1, 5), | D(1, 6) |
| 000000D(2, 1), | D(2, 2), | D(2, 3), | D(2, 4), | D(2, 5), | D(2, 6) |
| 000000D(3, 1), | D(3, 2), | D(3, 3), | D(3, 4), | D(3, 5), | D(3, 6) |
| 000000D(4, 1), | D(4, 2), | D(4, 3), | D(4, 4), | D(4, 5), | D(4, 6) |
| 000000D(5, 1), | D(5, 2), | D(5, 3), | D(5, 4), | D(5, 5), | D(5, 6) |
| 000000D(6, 1), | D(6, 2), | D(6, 3), | D(6, 4), | D(6, 5), | D(6, 6) |

Dependence data provided by the dependence detector 1100 is insufficient to define dependence among all valid instructions stored in the instruction memory 810. It is necessary to consider dependence among the valid instructions already stored in the instruction memory 810.

More precisely, the dependence detector 1100 provides information about whether or not an instruction (for example, an instruction A) to be stored in the instruction memory 810 is directly dependent on valid instructions (for example, valid instructions B to F) already stored in the instruction memory 810. On the other hand, the dependence memory 2110 provides information that, for example, the instruction A is directly dependent on the instruction C, and that the instruction C is dependent on the instruction E. Namely, the dependence memory 2110 tells that the instruction A is directly dependent on the instruction C and indirectly on the instruction E.

The dependence detector 1100 provides dependence data for a given instruction a half period before the instruction is written into the instruction memory 810. The specifier 2130 sets the dependence data from the dependence detector 1100 to a corresponding one of the storage areas 2131 to 2136. The OR gate 2141 provides an OR of a column of dependence data corresponding to the instruction and transfers it to the dependence generator 2120 through a line 2111. At this time, the dependence data from the dependence detector 1100 is also transferred to the dependence generator 2120 through a line 1112. The corresponding OR gate 2121 of the dependence generator 2120 provides an OR of the data supplied through the lines 1112 and 2111. The output of the OR gate 2121 is temporarily stored in a corresponding one of the storage areas 2121 to 2126.

A write select signal for the instruction in question is supplied to the specifier 2130 through a line 2015, to write the temporarily stored dependence data into a specified row of the dependence memory 2110.

This operation is carried out for every instruction written into the instruction memory 810. Then, dependence data in the dependence memory 2110 covers every valid instruction stored in the instruction memory 810.

Dependence data for a branch instruction is generated in the same manner and is stored in the dependence memory 2110. As soon as the dependence data is stored, the corresponding OR gate 2141 receives a column of dependence data from a corresponding column of the dependence memory 2110. The output of the OR gate 2141 is given to the corresponding OR gate 2142. The branch instruction detected signal BI supplied through the line 1210 is inverted, and the inverted signal is delayed by a half period and supplied to the OR gate 2142 in synchronization with a write enable signal. The output of the OR gate 2142 is temporarily held in the latch circuit 2143. Thereafter, the branch instruction dependence provider 2140 provides branch instruction dependence data related to the branch instruction in question to the order block 2000 through a line 2102 and to the mask 1400 through lines 1330 and 1340.

Dependence data in the dependence memory 2110 for a given instruction must be cleared when the instruction is read out. For this purpose, column data in the dependence memory 2110 corresponding to the read instruction is cleared. Namely, the order block 2000 provides the memory 2110 with a read select signal for specifying the instruction through a line 2016 to clear the corresponding column data.

The instruction queue 80 having the above-mentioned arrangement is capable of changing the order of reading instructions so that instructions that are independent of a branch instruction are put behind the branch instruction.

What is claimed is:

1. An instruction queue comprising:
   a dependence detector for detecting data dependence between an instruction to be written into an instruction memory and instructions presently stored in the instruction memory;
   a branch instruction detector for determining whether or not the instruction to be written into the instruction memory is a branch instruction;
   an order controller for referring to, if said branch instruction detector detects a branch instruction, the data dependence detected by said dependence detector, to find out instructions that are independent of the branch instruction among the instructions stored in the instruction memory, and putting the independent instructions behind the branch instruction so that the branch instruction is read out of the instruction memory before the independent instructions; and
   a mask for preserving the independent instructions in the instruction memory when the contents of the instruction memory are invalidated in response to the writing of the branch instruction into the instruction memory, wherein said order controller includes:
      a dependence block for generating branch instruction dependence data that clarifies dependence of the instructions stored in the instruction memory on the branch instruction detected by said branch instruction detector, according to the branch instruction and the data dependence detected by said dependence detector; and
      an order block for determining the order of reading instructions out of the instruction memory whenever an instruction is read out of or written into the instruction memory and storing the instruction reading order, the order block changing the instruction reading order according to the branch instruction dependence data so that the branch instruction is read out of the instruction memory before the instructions that are independent of the branch instruction.

2. The instruction queue as claimed in claim 1, wherein the dependence block includes:
   a dependence memory for storing dependence data;
   a dependence generator for generating dependence data according to the dependence data stored in the dependence memory and the data dependence provided by said dependence detector and storing the generated dependence data in the dependence memory;
   a branch instruction dependence provider for providing the branch instruction dependence data for the instructions stored in the instruction memory, according to the dependence data stored in the dependence memory and a signal informing of detection of the branch signal; and
   a specifier for specifying a location in the dependence memory to store the dependence data generated by the dependence generator according to the data dependence provided by said dependence detector.

3. The instruction queue as claimed in claim 1, wherein the order block includes:
   an order memory for storing order data that determines the order of reading instructions out of the instruction memory and specifies a write address in the instruction memory;
   a fore instruction data provider for providing the order memory with fore instruction data for the instructions stored in the instruction memory;
   a hind instruction data provider for providing the order memory with hind instruction data for the instructions stored in the instruction memory;
   an input controller for controlling the storing of the fore and hind instruction data into the order memory and changing the order data in the order memory to change the order of reading instructions out of the instruction memory; and
   a read select signal generator for generating, according to the order data stored in the order memory, a read select signal to select an instruction to be read out of the instruction memory.

4. In a RISC processor having a single pipeline, comprising an instruction fetch unit for fetching instructions from a memory, an instruction decoder for decoding instructions fetched by said instruction fetch unit, an instruction queue for temporarily storing instructions as decoded by said instruction decoder, an execution unit for executing instructions as dispatched from said instruction queue, said instruction queue comprising:
   a dependence detector for detecting data dependence among instructions stored in said instruction queue; and
   a branch instruction detector for determining whether or not each instruction as fetched is a branch instruction;
   an order controller for dispatching, subsequent to a branch instruction, a preceding instruction which has been fetched in advance of the branch instruction but exerts no influence upon execution of the branch instruction;
   wherein the preceding instruction is effectively executed after the branch instruction regardless of whether or not the branch is taken.

* * * * *